(12) United States Patent
Behnia

(10) Patent No.: US 11,041,829 B2
(45) Date of Patent: Jun. 22, 2021

(54) MEASUREMENT OF FRACTURE CHARACTERISTICS OF ADHESIVE POLYMERIC MATERIALS USING SPIRAL CRACKING PATTERN

(71) Applicant: Behzad Behnia, Potsdam, NY (US)

(72) Inventor: Behzad Behnia, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 33 days.

(21) Appl. No.: 16/265,288

(22) Filed: Feb. 1, 2019

(65) Prior Publication Data

US 2019/0242855 A1 Aug. 8, 2019

Related U.S. Application Data

(60) Provisional application No. 62/625,084, filed on Feb. 1, 2018.

(51) Int. Cl.
*G01N 29/14* (2006.01)
*G01N 29/24* (2006.01)

(52) U.S. Cl.
CPC ......... *G01N 29/14* (2013.01); *G01N 29/2437* (2013.01); *G01N 2291/0251* (2013.01); *G01N 2291/0289* (2013.01)

(58) Field of Classification Search
CPC .............. G01N 29/14; G01N 29/2437; G01N 29/2475; G01N 2291/0251; G01N 2291/0289
USPC .......................................................... 73/587
See application file for complete search history.

(56) References Cited

U.S. PATENT DOCUMENTS

| | | | | |
|---|---|---|---|---|
| 6,826,982 B2 * | 12/2004 | O'Brien | ............... | G01M 5/0033 73/587 |
| 2010/0162816 A1 * | 7/2010 | Thoret Bauchet | ..... | G01N 29/40 73/587 |
| 2012/0125108 A1 * | 5/2012 | Muravin | ............... | G01N 29/043 73/587 |

FOREIGN PATENT DOCUMENTS

WO    WO-2011115261 A1 *  9/2011  ............. G01N 29/14

\* cited by examiner

*Primary Examiner* — Lisa M Caputo
*Assistant Examiner* — Rose M Miller
(74) *Attorney, Agent, or Firm* — Bond Schoeneck & King, PLLC; George McGuire

(57) ABSTRACT

A method for measuring fracture characteristics of adhesive polymeric material comprises: (i) bonding a sample to a rigid substrate; (ii) cooling the sample from a first temperature to a second temperature such that thermally-induced stresses are generated within the sample, wherein the thermally-induced stresses generate an inward-growing three-dimensional spiral crack within the sample; (iii) detecting, by three or more AE piezoelectric sensors, mechanical transient waves generated during development of the inward-growing three-dimensional spiral crack within the sample and determining the accurate 3D geometry of the spiral using source location technique; (iv) visualizing the two-dimensional spiral cracking pattern deposited on a surface of the rigid substrate and measuring the precise width of the crack; (v) determining, using the detected mechanical waves and the visualized deposited sample, AE-based fracture characteristics of the sample; and (vi) reporting the determined one or more fracture characteristics of the sample.

2 Claims, 4 Drawing Sheets

400

Provide a sample of a polymer for testing
410

Bond the sample to a rigid substrate
420

Cool the sample
430

Detect and monitor mechanical waves
440

Sample depositied on the substrate is visualized
450

Determine one or more characteristics of the sample using the obtained data
460

Provide the determined one or more characterisitcs
470

FIG. 4

MEASUREMENT OF FRACTURE CHARACTERISTICS OF ADHESIVE POLYMERIC MATERIALS USING SPIRAL CRACKING PATTERN

CROSS-REFERENCE TO RELATED APPLICATIONS

The present application relates and claims priority to U.S. Provisional Patent Application No. 62/625,084, filed Feb. 1, 2018, the entirety of which is hereby incorporated by reference.

FIELD OF THE DISCLOSURE

The present disclosure relates to systems and methods for measuring one or more fracture characteristics of adhesive polymeric materials.

BACKGROUND

Cracking is an important issue in performance of materials such as asphalt, paint layers, and glues, among many other adhesive materials. For example, in the case of asphalt materials, in the U.S. alone every year millions of dollars of taxpayer money is spent fixing and rehabilitating cracks in the roads.

Currently available testing methods and systems configured to measure the fracture properties of materials are neither convenient nor cost-effective. In addition, these methods and systems include significant limitations, especially when testing soft adhesive polymers. Moreover, these testing methods and systems suffer from poor repeatability and require significant operator training and care. For example, the equipment cost for currently available testing methods and systems are in the range of USD $150,000 to $200,000 depending upon test device features.

Accordingly, there is a continued need for affordable and efficient methods and systems for quickly assessing the cracking characteristics of polymers.

BRIEF SUMMARY OF THE DISCLOSURE

The present disclosure is directed to a method and/or system for measuring one or more fracture characteristics of adhesive polymeric materials. According to an embodiment, the method comprises the following steps: (i) providing a sample for analysis; (ii) bonding the sample to a rigid substrate; (iii) cooling the sample from a first temperature to a second temperature such that thermally-induced stresses are generated within the sample (due to thermal contraction coefficients mismatch between polymer and the substrate material) leading to development of an inward-growing three-dimensional spiral crack within the sample; (iv) detecting, by three or more Acoustic Emission (AE) piezoelectric sensors mounted on the surface of the specimen and/or the rigid substrate, the emitted mechanical transient waves from generation of new fractured surfaces in the sample due to propagation of the inward-growing three-dimensional spiral crack within the sample; (v) determining the accurate 3D geometry of the spiral crack in the material and measuring the exact varying depth of crack penetration through the specimen thickness along the crack path, using multi-sensor AE source location technique; (vi) implementing the digital image analysis (DIA) to determine the spiral crack width as well as the mathematical model for the 3D geometry of spiral cracks; (vii) calculating the total fractured surface area inside the sample using the exact width, depth, and length of spiral crack measured through integrated AE-DIA approach; (viii) determining the AE-based fracture characteristics of the polymer material using total amount of emitted AE energy and total fracture surfaces within the sample; and (ix) reporting the determined fracture characteristics of the sample.

According to an embodiment, the system comprises: (i) a sample bonded to a rigid substrate and cooled down from a first temperature to a second temperature; (ii) three or more AE piezoelectric sensors configured to detect mechanical stress waves originated from generation of the inward-growing three-dimensional spiral cracks within the sample; (iii) a visualization device configured to digitize and perform digital image analysis on the 2D spiral pattern deposit of the material left of the rigid substrate; and (iv) a processor configured to determine AE-based fracture characteristics of the sample using cumulative AE energies of detected mechanical waves as well as the precise 3D geometry of the spiral crack obtained from integrated AE-DIA approach.

These and other aspects of the invention will be apparent from the embodiment(s) described hereinafter.

BRIEF DESCRIPTION OF THE SEVERAL VIEWS OF THE DRAWING(S)

The present invention will be more fully understood and appreciated by reading the following Detailed Description in conjunction with the accompanying drawings, in which:

FIG. 4 is a flowchart of a method for analyzing a fracture characteristic of an adhesive polymeric material, in accordance with an embodiment.

DETAILED DESCRIPTION

The present disclosure is directed to a method and/or system for measuring fracture characteristics of adhesive polymeric materials. According to an embodiment, the novel method described herein for measuring AE-based fracture characteristics of an adhesive polymeric material provides simple and rapid determination of the fracture characteristics of adhesive polymeric materials such as paint, liquid glues, and asphalt binders, among many others. This technique addresses the current shortage of a rapid, practical, and cost-effective testing approach for crack resistance characterization of adhesive materials. The outcomes of this innovative technique enable improved engineered design of fracture-resilient adhesive materials, and yield significant payoff to practice for both up-stream and down-stream suppliers and producers. Suppliers of adhesive polymers can, for example, utilize this novel technological development to rapidly assess the cracking characteristics of formulations of polymers and, by modifying the formulation, design crack-resistant materials.

According to an embodiment, the method and/or system described or otherwise envisioned herein for measuring one or more fracture characteristics of an adhesive polymeric material utilizes a multi-sensor Acoustic Emission (AE)

source location approach in conjunction with Digital Image Analysis (DIA) to meticulously determine the precise geometry and mathematical model of the three-dimensional spiral crack in a bi-axially stressed layer of adhesive polymeric material, and to detect and record all acoustic activities of the crack while the test is conducted. Results from the integrated AE-DIA approach are used to compute the fracture energy of the material.

Figure 1:
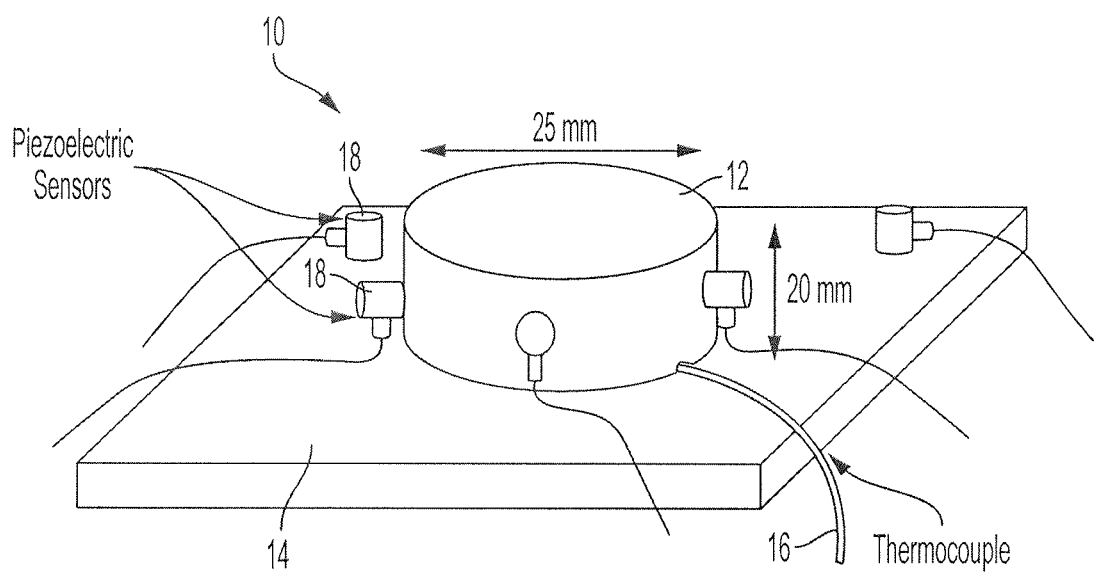
FIG. 1 is a schematic representation of a system for analyzing a fracture characteristic of an adhesive polymeric material, in accordance with an embodiment.

Referring to FIG. 1, in one embodiment, is a schematic representation of an AE-DIA system, represented generally by reference numeral 10, for measuring one or more fracture characteristics of an adhesive polymer. According to this example, a 20 mm thick cylindrical sample of adhesive polymeric material 12 with a diameter of 25 mm is bonded to a rigid substrate 14 such as aluminum. The rigid substrate material will be chosen based on the type of adhesive polymer being tested. The sample is cooled down from about 20° C. to about −70° C., although many other temperatures are possible depending on type of the adhesive polymer. The temperature of the specimen is continuously recorded using a k-type thermocouple 16 positioned at the interface of the specimen 12 and the substrate 14. As the specimen 12 cools down, differential thermal contraction between the rigid substrate 14 and the polymer induces equi-biaxial thermally-induced stresses within the material, thereby resulting in the formation of an inward-growing three-dimensional spiral crack within the specimen.

As the spiral crack propagates inward, it creates new fractured surfaces, which is accompanied by release of stored strain energy in the form of transient mechanical waves inside the specimen. The AE piezoelectric sensors 18 mounted on the surface of the specimen 12 as well as the substrate 14 will continuously monitor and detect these mechanical waves and convert them in to AE signals. According to an embodiment, three of AE piezoelectric sensors 18 are mounted on the surface of the specimen 12 and three of the AE piezoelectric sensors are mounted on the rigid substrate 14, although many other configurations are possible. Recorded AE signals are carefully analyzed to compute the emitted energy associated with each AE event (i.e. AE event is a rapid physical change such as microcracks in microstructure of the material, appearing as acoustic signal). Moreover, the cumulative AE energy is calculated to measure the total amount of released AE energy due to creation of new fractured surfaces in the sample. The emitted AE energy is proportional to the extent of damage in the material. Accordingly, the larger the size of microdamage, the higher the amount of emitted AE energy. In addition to measuring the cumulative AE energy, a multi-sensor Geiger iterative source location approach can be employed to analyze the recorded AE signals and to precisely visualize the accurate 3D geometry of the spiral crack in the material which will result in measuring the exact varying depth of crack penetration through the specimen thickness along the crack path.

Figure 2:
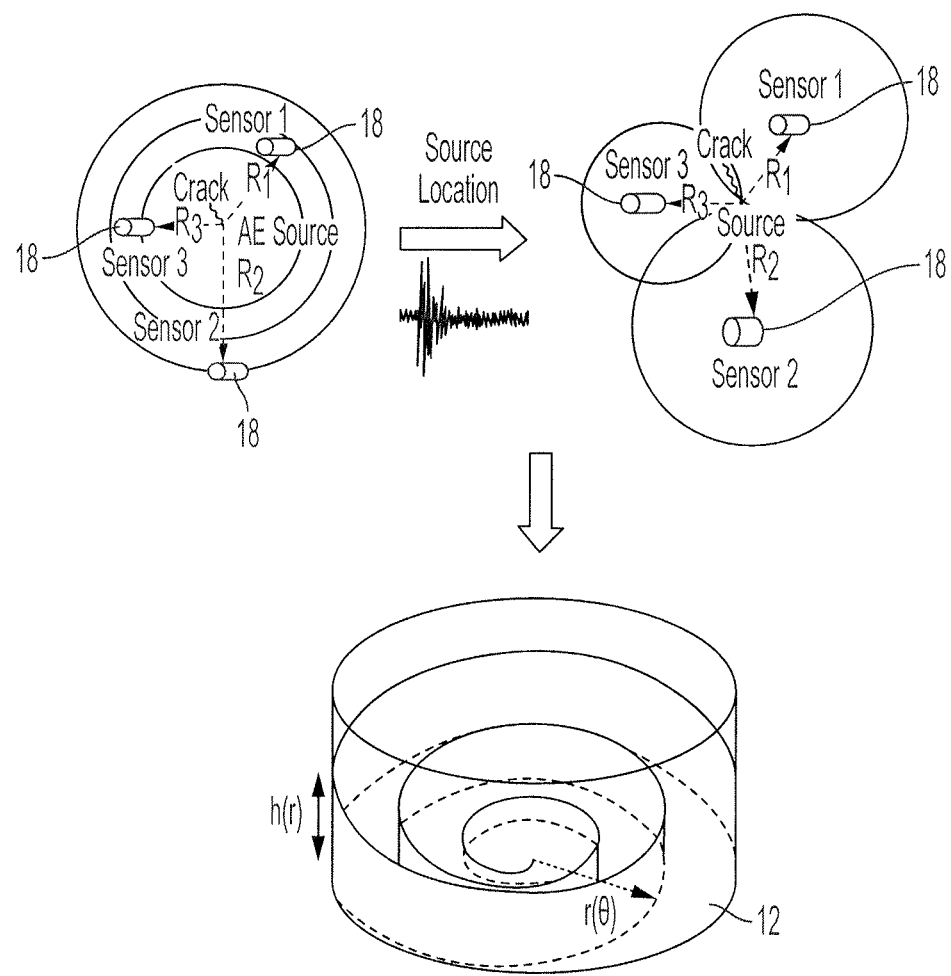
FIG. 2 is a schematic representation of a method for analyzing a fracture characteristic of an adhesive polymeric material, in accordance with an embodiment.

Referring to FIG. 2 is a schematic representation of the spiral crack geometry determination using the multi-sensor AE source location technique.

Figure 3:
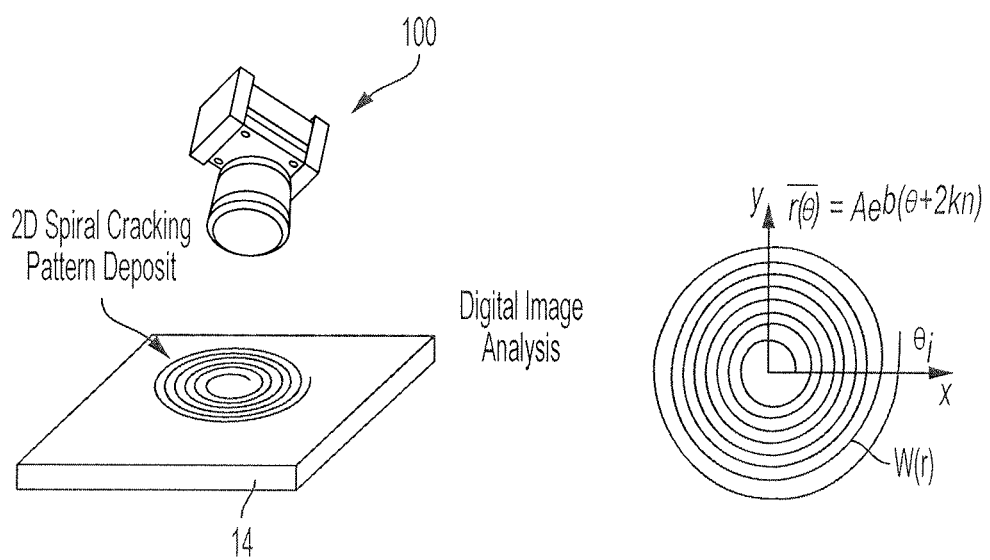
FIG. 3 is a schematic representation of a system for analyzing a fracture characteristic of an adhesive polymeric material, in accordance with an embodiment.

Referring to FIG. 3 is a schematic representation of the DIA computer vision 100 approach utilized to digitally analyze the HD images of the two-dimensional spiral pattern deposit of the material left of the substrate 14. The mathematical model will be automatically fit to the crack pattern and the spiral tightness parameter, "b", and the spiral scaling factor, "A" will be determined.

According to an embodiment, the precise calculations of total fractured surface area inside the specimen can be achieved using the exact width, depth, and length of spiral crack measured through the integrated AE-DIA approach. The AE-based fracture energy ($G_{f\text{-}AE}$) of the material which is the amount of released AE energy per unit of newly created fracture surface area can be computed using the following equation:

$$G_{f\text{-}AE} = \frac{\sum_{i=1}^{N}\left(\int_0^t V_i^2(t)dt\right)}{\sum A_{Fractured}} \qquad \text{Eq. 1}$$

The $G_{f\text{-}AE}$ is calculated by dividing the cumulative emitted AE energy by the total fractured surface area within the sample 12. The units of $G_{f\text{-}AE}$ are $V^2 \cdot \mu sec/mm^2$.

Referring to FIG. 4 is a flowchart of a method 400 for measuring AE-based fracture characteristics of an adhesive polymer using a multi-sensor Acoustic Emission (AE) source location approach in conjunction with Digital Image Analysis (DIA).

At step 410 of the method, a polymeric material sample is provided. The sample can be any adhesive polymer for testing, including but not limited to paint, glue, asphalt, and many other materials. The sample can be provided by or obtained from any source for testing.

At step 420 of the method, the sample is bonded to a rigid substrate. The rigid substrate can be any substrate capable of enabling the method to be performed. According to one embodiment, there are two requirements for the rigid substrate: 1) substrate material should have a strong adhesion with polymer material, 2) there should be a significant difference between thermal contraction coefficient of substrate and polymer material in order to induce enough thermal stress within the sample to develop a spiral crack in the specimen. As one example, the rigid substrate can be aluminum or granite, although many other substrates are possible.

At step 430 of the method, the sample is cooled from a first temperature to a lower temperature. The sample is cooled from a first temperature to a second temperature that is sufficient to induce differential thermal contraction between the rigid substrate and the polymer, which results in thermally-induced stresses within the sample. According to just one example, the sample is cooled down from about 20° C. to about −70° C., although many other temperatures are possible. According to an embodiment, this cooling induces equi-biaxial thermally-induced stresses within the sample, which produces one or more inward-growing three-dimensional spiral cracks within the specimen. As the spiral crack propagates inward it creates new fractured surfaces, which is accompanied by release of stored strain energy in the form of transient mechanical waves inside the specimen.

At step 440 of the method, three or more AE piezoelectric sensors mounted on the surface of the specimen and the substrate monitor and detect mechanical waves generated in step 430 and convert them in to AE signals. The AE signals may be analyzed in real-time and/or recorded for future analysis. According to an embodiment, the AE signals are carefully analyzed to compute the emitted energy associated with each AE event. Additionally, the cumulative AE energy can be calculated to measure the total amount of released AE energy due to creation of new fractured surfaces in the sample. The emitted AE energy is proportional to the extent of damage in the material. Accordingly, the larger the size of microdamage, the higher the amount of emitted AE energy. In addition to measuring the cumulative AE energy, a multi-sensor Geiger iterative source location approach can be employed to analyze the recorded AE signals and to precisely visualize the accurate 3D geometry of the spiral crack in the material which will result in measuring the exact varying depth of crack penetration through the specimen thickness along the crack path.

At step 450 of the method, sample deposited on the substrate as a result of the fracturing is visualized. According to an embodiment, the DIA vision approach described herein is utilized to digitally analyze the HD images of the two-dimensional spiral pattern deposit of the material left of the substrate.

At step 460 of the method, the information obtained from steps 440 and 450 is utilized to determine one or more fracture characteristics of the sample. For example, according to an embodiment, calculations of total fractured surface area inside the specimen can be achieved using the width, depth, and/or length of spiral crack measured in steps 440 and 450 of the method. According to an embodiment, the AE-based fracture energy ($G_{f\text{-}AE}$) of the material which is the amount of released AE energy per unit of newly created fracture surface area can be computed using Equation 1. As depicted in equation (1), the $G_{f\text{-}AE}$ can be calculated by dividing the cumulative emitted AE energy by the total fractured surface area within the sample, where the units of $G_{f\text{-}AE}$ are $V^2 \cdot \mu sec/mm^2$.

At step 470 of the method, the determined AE-based fracture characteristics of the sample can be provided to a user, a computer, a server, a user interface, or any other destination or output. For example, the determined $G_{f\text{-}AE}$ fracture characteristics of the sample can be provided as a text report, a graph, and/or any other means of providing the output of the system.

Although the present invention has been described in connection with a preferred embodiment, it should be understood that modifications, alterations, and additions can be made to the invention without departing from the scope of the invention as defined by the claims.

What is claimed is:

1. A method for fracture characterizing of adhesive polymers, the method comprising the steps of:
   providing a sample for analysis;
   bonding the sample to a rigid substrate;
   cooling the sample from a first temperature to a second temperature such that thermally-induced stresses are generated within the sample, wherein the thermally-induced stresses generate an inward-growing three-dimensional spiral crack within the sample;
   detecting, by three or more AE piezoelectric sensors mounted on the surface of the sample and/or the rigid substrate, mechanical transient waves generated during development of the inward-growing three-dimensional spiral crack within the sample and determining an accurate 3D geometry of a spiral using source location technique;
   visualizing a two-dimensional spiral cracking pattern deposited on a surface of the rigid substrate as a result of the generation of the inward-growing three-dimensional spiral crack within the sample and measuring a precise width of the crack;
   determining, using the detected mechanical waves and a visualized deposited sample, AE-based fracture characteristics of the sample; and
   reporting the AE-based fracture characteristics of the sample.

2. A system for characterizing an adhesive polymer, the system comprising:
   a sample bonded to a rigid substrate;
   three or more AE piezoelectric sensors mounted on the surface of the sample and the rigid structure, wherein the AE piezoelectric sensors are configured to detect a mechanical wave generated during development of an inward-growing three-dimensional spiral crack within the sample and also to perform AE source location approach to determine a 3D geometry of the spiral crack;
   a visualization device configured to visualize a 2D spiral cracking pattern of the adhesive polymer deposited on a surface of the rigid substrate as a result of the generation of the inward-growing three-dimensional spiral crack within the sample; and
   a processor configured to determine, using the detected mechanical wave and the visualized 2D spiral cracking pattern, fracture characteristics of the sample.

* * * * *